United States Patent [19]

Davlantes

[11] Patent Number: 5,287,654
[45] Date of Patent: Feb. 22, 1994

[54] PET ACCESS DOOR FRAME MODULAR UNIT

[76] Inventor: George N. Davlantes, 21457 Iglesia Dr., Woodland Hills, Calif. 91364

[21] Appl. No.: 776,664

[22] Filed: Oct. 15, 1991

[51] Int. Cl.$^5$ .............................................. E06B 11/00
[52] U.S. Cl. ......................................... 49/169; 49/171
[58] Field of Search ................ 49/169, 171, 505, 463, 49/465; 160/116, 180, 368.1

[56] References Cited

U.S. PATENT DOCUMENTS

| | | | |
|---|---|---|---|
| 3,861,081 | 1/1975 | Maskell | 49/463 X |
| 4,043,079 | 8/1977 | Smith | 49/169 X |
| 4,047,331 | 9/1977 | Davlantes | 49/171 |
| 4,259,818 | 4/1981 | Stark | 49/171 X |
| 4,651,793 | 3/1987 | Davlantes | 49/169 X |
| 4,730,413 | 3/1988 | Henry | 49/463 X |
| 4,839,989 | 6/1989 | McConnell | 49/171 |
| 4,856,575 | 8/1989 | Wells | 49/171 X |

Primary Examiner—Peter M. Cuomo
Assistant Examiner—Jerry Redman
Attorney, Agent, or Firm—Lahive & Cockfield

[57] ABSTRACT

A modular pet access door unit for insertion into a hole cut into a door or wall has exterior frames and spacer frames, fastened together by fasteners extending horizontally through brackets in the spacer frames. The spacer frames have tongue and groove surfaces for nesting with each other. Both exterior frames may carry a pet access door. A security cover mounts on posts with annular grooves, and may be moved horizontally into position to cover the pet opening, where sliders in the security cover with keyhold-shaped holes engage the post annular grooves. The pet door is captured in the frame between the frame and a door or flap holder that is secured to the frame by removably fasteners. An automatically adjustable sill is movable by magnetic attraction to the flap bottom, where its position is secured by fasteners.

9 Claims, 8 Drawing Sheets

PET ACCESS DOOR FRAME MODULAR UNIT

BACKGROUND OF THE INVENTION

This invention relates to pet access doors and more particularly to a modular version of pet access doors and frames.

Pet access doors allow the passage of small pets through holes in doors or walls. Originally they consisted principally of a frame mounted on the surface of the door or wall at the edges of a hole that had been cut, and a door hinged on the frame to keep the elements out but to allow passage of a small animal through the hole by its pushing against the hinged door. For security purposes a frame was often mounted on the inside surface of the door or wall, with some arrangement for a sturdy security panel to be affixed to this inside frame so that it was not removable from the outside. Examples of such frames can be found in the present inventor's earlier U.S. Pat. Nos. 4,408,416 and 4,651,793.

When the frames are mounted on the exterior surfaces of the inside and outside of the door or wall in which a hole is cut, however, the interior portion of the door or wall that is exposed by the cut may not be sufficiently covered by the inside and outside frames. This is unattractive; it may be dangerous to the pet using the door; and it may allow access to the inside security panel fasteners. Attempts to alleviate this problem include putting horizontally extending walls on the inside and outside surface mounted frames to cover the interior of the hole. Since doors and walls are of different thicknesses, however, having a fixed depth of horizontal wall on the frame is problematical.

One solution to this problem is to have a horizontal wall member with break-away elements so that unneeded portions of the horizontal walls could be broken off. To make the break away portions convenient to break away, however, is also to make them relatively vulnerable to tampering. Also, if somebody assembling such a unit makes a mistake and breaks away too much of the wall portion, there is no opportunity to rectify the mistake.

The goals of any good pet access door unit are security of the building in which the door is used, functionality (that is, that it be convenient to use and provide protection from the elements for the building in which it is used), appearance, and strength. It is an object of this invention to provide a modular construction of a pet access door unit that meets these goals. Other objects are to allow use of two flaps in a constructed unit, to provide a security cover that may be applied in a horizontal motion, to allow attachment or removal of a flap to or from the frame while the frame is in place, and to provide for an automatically adjustable magnetic sill.

SUMMARY OF THE INVENTION

The invention provides a pet access door unit for insertion into a hole cut in a door or wall having two exterior frames defining an opening, for mounting at an edge of the hole on opposite sides of the hole. At least one of the exterior frames includes attachment means for attaching a pet access door. The unit includes one or more spacer frames defining an opening, for insertion into the hole between the exterior frames, the spacer frames being in telescoping arrangement with the exterior frame, and also includes means for fastening the exterior frames to the spacer frames.

In a preferred embodiment the spacer frames have fastener brackets for fasteners extending horizontally to adjustably fasten the exterior frames and the spacer frames into a unit, and the spacer frames have nestable tongue and groove surfaces for abutting relationship to each other.

Preferably, both exterior frames have attachment means for attaching pet access doors.

Another aspect of the invention provides a pet access door unit for insertion into a hole cut in a door or wall comprising an exterior frame defining an opening for mounting at an edge of the hole, a plurality of posts extending horizontally from the exterior frame, a security panel sized to close the opening, and at least one slider, slidably mounted in the security panel with means to engage the posts. Preferably, the posts bear annular grooves and the slider defines keyhole-shaped holes with lower wider and upper narrower portions, the portion of the slider with the narrower portion of the hole being engagable with the post grooves, whereby the security panel may be moved to the frame in a horizontal motion for securing to the frame. Further, the portion of the slider adjacent the lower edge of the wider portion of the keyhole-shaped hole has an edge portion displaced to not engage the post groove.

In another aspect of the invention, a pet access door unit for insertion into a hole cut in a door or wall comprises an exterior frame defining a pet passage opening, for mounting at an edge of the hole, a pet access door, a pet access door securing bar for capturing an upper portion of the pet access door between the bar and the frame, and at least one fastener for fastening the bar to the frame. Preferably, the exterior frame defines a first lip portion, the bar defines a second lip portion, and the pet access door has an upper portion including projecting portions captured by the lip portions when the bar is fastened to the frame.

In still another aspect of the invention, a pet access door unit for insertion into a hole cut in a wall or door comprises an exterior frame defining a pet access door hingedly mounted on the frame in the pet passage opening and having a magnet-attracting bottom portion, a sill vertically movably mounted beneath the pet access door on the exterior frame, magnets being mounted in the sill so that the sill may be attracted toward the pet access door, and releasable fasteners for fastening the sill to the frame when the sill is closely adjacent the pet access door.

BRIEF DESCRIPTION OF THE DRAWINGS

Other objects, features and advantages of the invention will be apparent from the following description of a preferred embodiment of the invention, including the drawings thereof, of which

DESCRIPTION OF A PREFERRED EMBODIMENT

Figure 1:
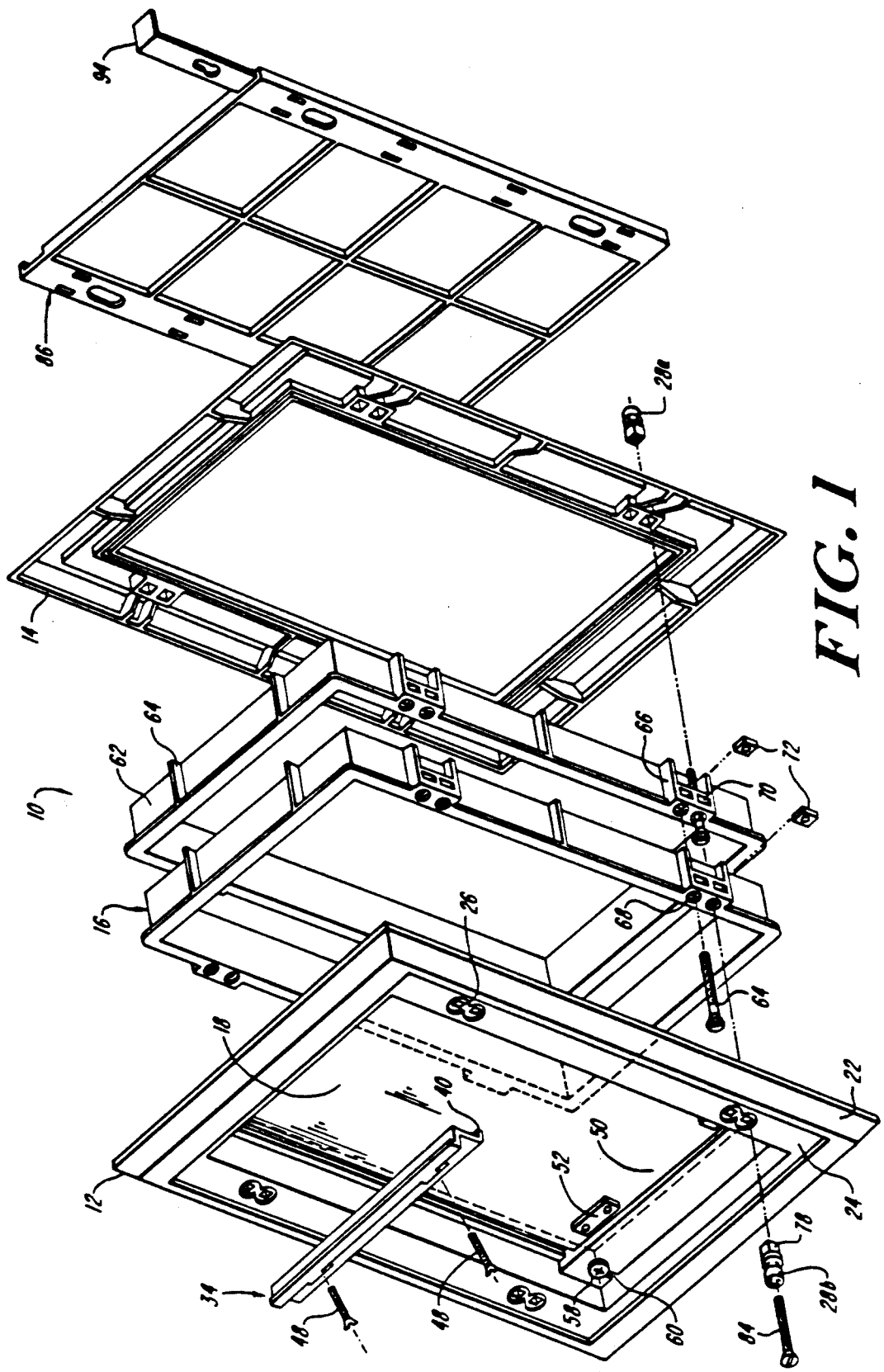
FIG. 1 is an exploded view of a pet access door frame modular unit constructed according to the invention.
Figure 3:
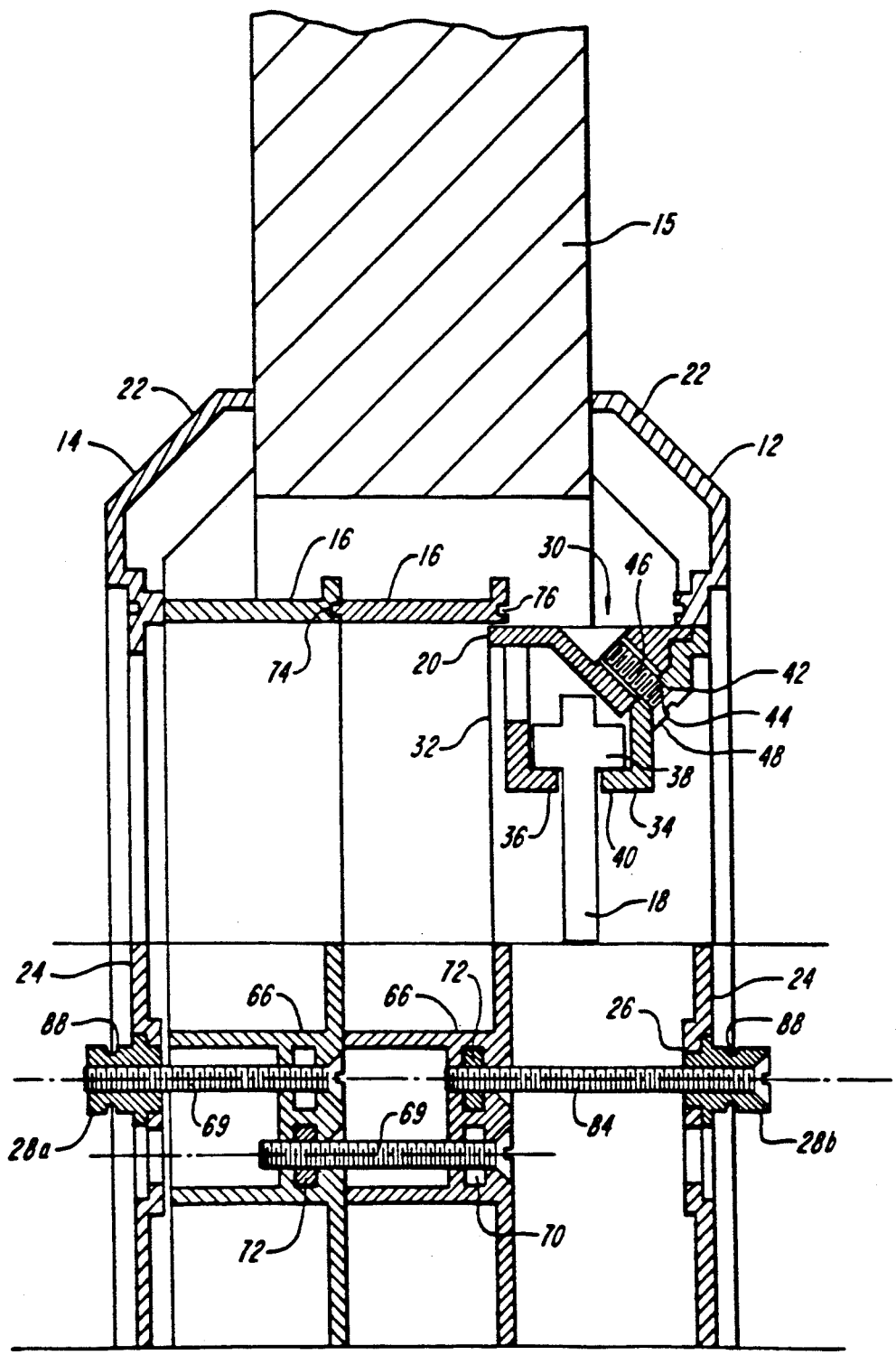
FIG. 3 is a cross-sectional view of the upper portion of the assembled frame.

As shown in FIG. 1 of the drawings, one version of a frame unit 10 consists of inside and outside surface mounted exterior frames 12, 14, respectively, and a number of spacer frames 16 in between. In the embodiment shown in FIG. 1, the inside exterior surface mounted frame 12 has a flap 18. FIG. 3 is a cross-sectional view of the unit 10 assembled through a hole cut in a door or wall 15.

The number of spacer frames 16 is determined by the depth of the door or wall 15 through which a hole has been cut. The horizontally extending wall 20 of the inside exterior flap-bearing frame 12 has dimensions selected so that it may telescope through the inside of the spacer frame 16, making some adjustment of the width of the unit 10 possible (see FIG. 3). The amount of adjustment possible is equal to the width of one of the spacer frames 16. In short, an adjustment can be made in the width of the entire unit 10 up to the point that another spacer frame 16 is necessary.

Figure 2:
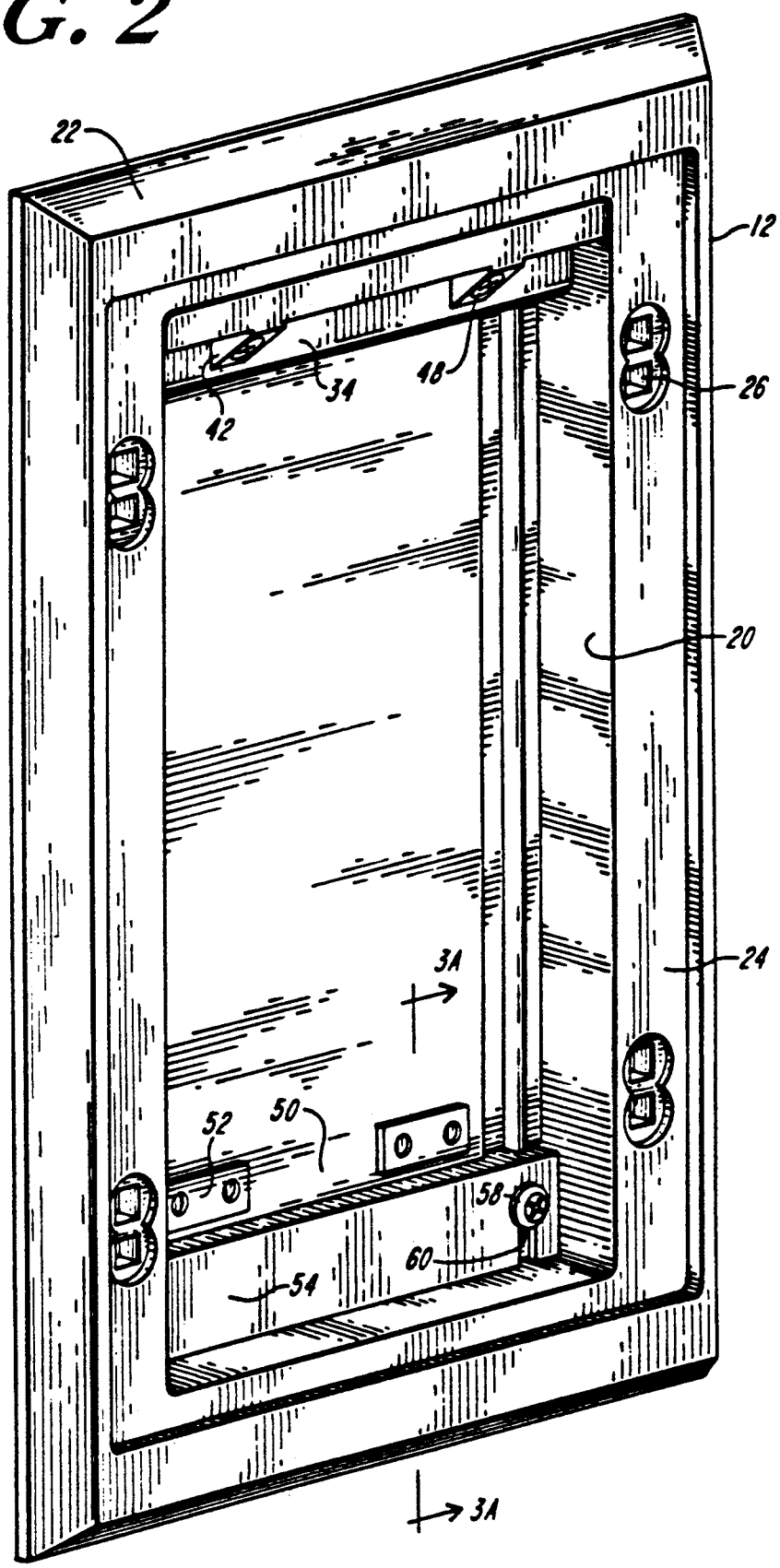
FIG. 2 is a perspective view of an inside, flap-bearing, exterior frame of the unit.

Each exterior frame 12, 14 (see FIGS. 1 and 2) has a beveled exterior surface wall 22 to cover the perimeter of the hole cut through the door or wall. The exterior surface wall 22 includes a flat perimeter surface 24 with holes 26 for fastener posts 28a, 28b for attachment of the exterior frame 12, 14 to the rest of the unit 10.

The flap-bearing exterior frame 12 has, in addition, a top portion 30 (see FIGS. 1 and 3) that includes a short wall 32 onto which a flap holder 34 can be secured. The short wall 32 includes a bottom lip 36 above which protruding elements 38 of the flap 18 are located. The flap holder, or bar, 34 includes another lower lip 40 for capturing the projections 38 at the top of the flap 18. The holder 34 also includes two diagonal struts 42 with holes 44 through them aligned with threaded holes 46 in the top 30 of the frame 12. The holes 44 drilled through the struts 42 are oriented so that screws 48 enter them at a 45° angle (see FIG. 3). The screws 48 through the holder 34 are captured in the threaded holes 46 at the top 30 of the frame 12 to hold the flap 18 in place.

Figure 3A:
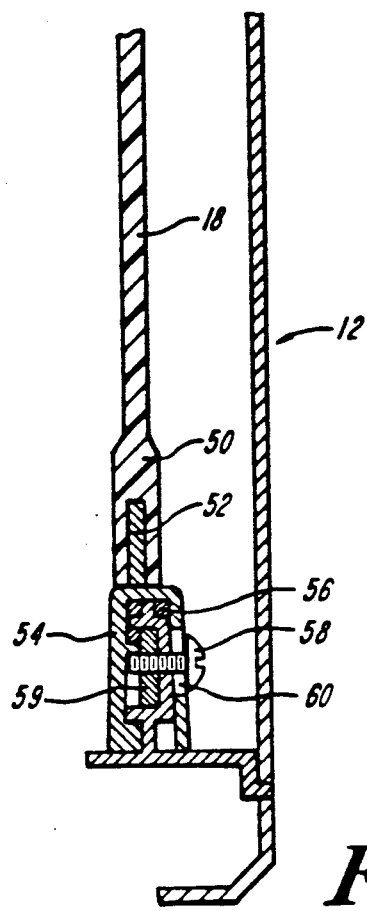
FIG. 3A is a detailed cross-sectional view of the lower portion of a flap-bearing frame of the assembled frame.

The flap 18 is made of pliable plastic so that it can bend and be pushed easily by a pet moving through the unit 10. The bottom 50 of the flap 18 has magnets 52 embedded in it which are aligned generally with corresponding magnets 56 held within the sill 54 at the bottom of the frame 12 (see FIG. 3A).

At the bottom of frame 12 (see FIGS. 1, 2 and 3A) is a movable sill 54, in which are mounted magnets 56. The sill 54 is movable and adjustable by way of slots 60 of the movable sill 54. The sill 54 may be automatically adjusted by loosening adjusting screws 58 seated in nuts 59 allowing the movable sill 54 to move up to where its magnets 56 are drawn so that the sill 54 is brought just adjacent the bottom of the flap 18. The screws 58 can then be tightened and the sill 54 is adjusted to be as close as the flap 18 as possible.

Figure 4:
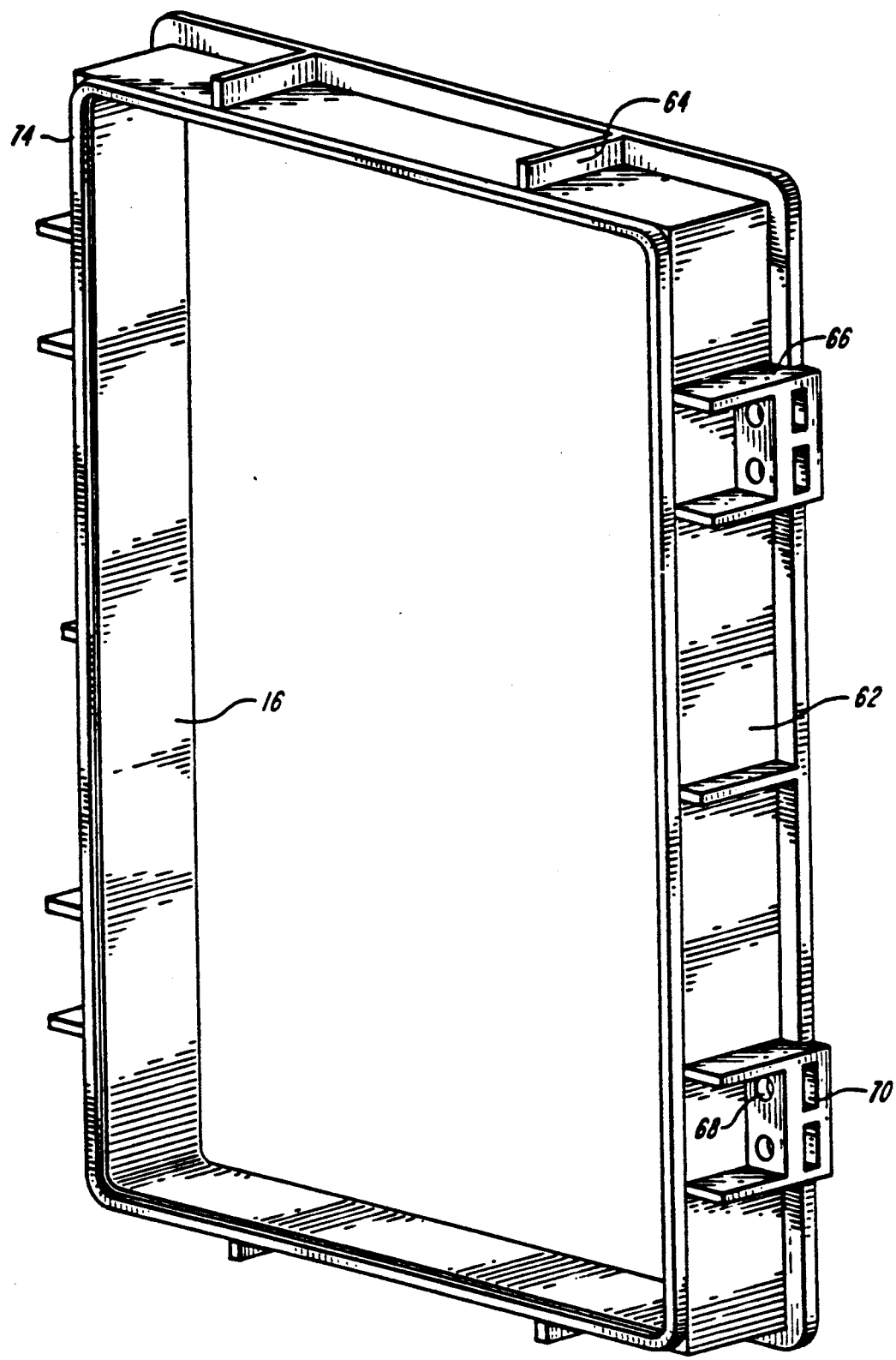
FIG. 4 is a perspective view of a spacer frame of the unit, showing the tongue projection.
Figure 5:
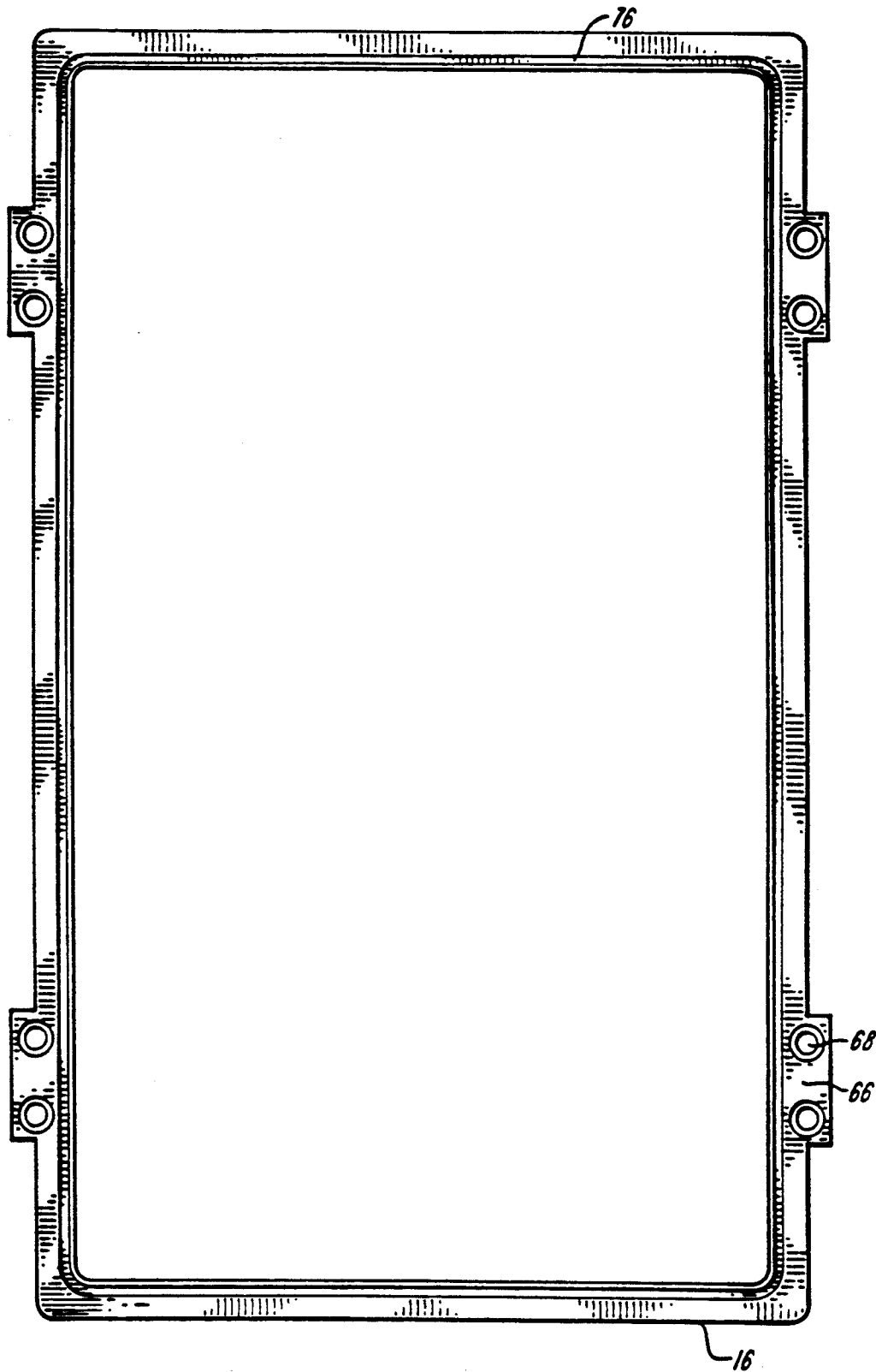
FIG. 5 is a plan view of the other side of the spacer frame of the unit that is shown in FIG. 4, showing the groove corresponding to the tongue.

Each spacer frame 16 is a generally rectangular frame with a short and outwardly facing perimeter wall 62. There are strengthening ribs 64 generally located at several locations on the exterior of the horizontally extending perimeter wall 62. Also included on the exterior of the horizontally extending perimeter wall 62 are fastener brackets 66 providing for pairs of holes 68 for the passage of threaded bolts 69 and slots 70 for capturing nuts 72. The outer wall 62 has matching tongues 74 (see FIG. 4) and grooves 76 (see FIG. 5) in the front and rear of the spacer respectively so that adjacent spacer frames 16 can be more securely lined up in a nesting relation and be resistant to lateral movement.

The assembly of the unit 10 is accomplished by a variety of threaded bolts 69, nuts 72 and fastener posts 28a and 28b. Alternate levels of holes 68 and nut capturing slots 70 of the exterior frames 12, 14 and the spacer brackets 66 are used to assemble the unit 10.

Figure 6:
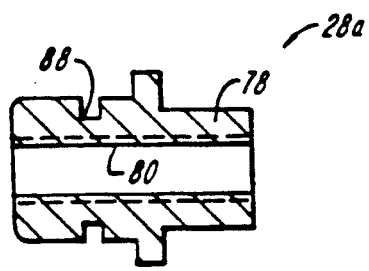
FIG. 6 is a cross-sectional view of an outside mounting fastener.

The outside exterior fastener posts 28a (see FIGS. 1 and 6) have a square base 78 to fit into the square hole 26 through the outside exterior frame 12 and have an interior threaded hole 80 in the square base 78 into which a bolt 69 can be threaded.

Figure 7:
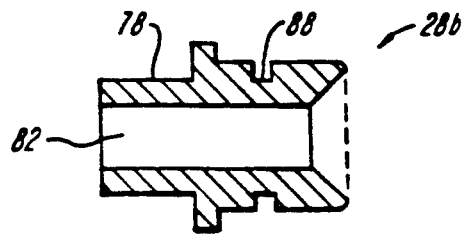
FIG. 7 is a cross-sectional view of an inside mounting fastener.

The first spacer frame 16 is connected to the exterior frame 14 by a bolt 69 threaded into the post's interior threaded hole 80. The next spacer frame 16 (if one is necessary) is connected by a nut 72 and bolt 69, using the alternate level of connecting holes 68 and nut slots 70 of the brackets 66. Finally, the inside exterior frame 12 is connected. Four fastener posts 28b (see FIGS. 1 and 7) similar to the ones 28a on the outside are used, except that each has a hole 82 entirely through it and a long bolt 84 is passed through the fastener post 28b and threaded to a nut 72 in one of the slots 70.

Figure 8:
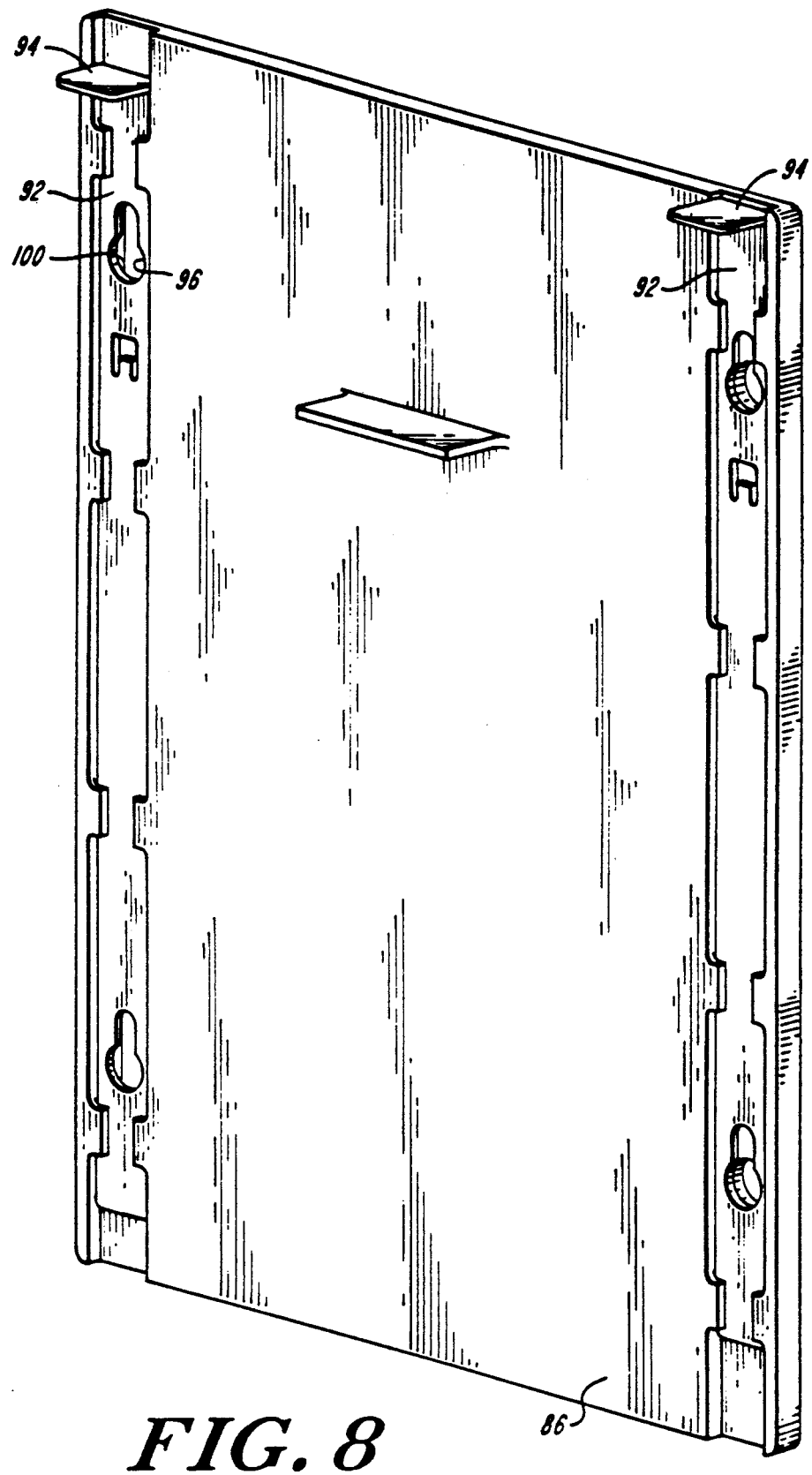
FIG. 8 is a perspective view of a security panel of the unit.

A security panel 86 (see FIGS. 1 and 8) is shown in position to be affixed to the outside exterior frame 14. The four fastener posts 28a projecting from the frame 14 have circumferential slots 88. The security 86 panel has elongated slots 90 that correspond to the location of the fastener posts 28a. The panel 86 is also of a size to fit into the recess formed by the frame 14. A pair of metal slides 92 is captured in the panel 86.

Each slide 92 includes tabs 94 to grasp to move the slide 92, and two keyhole shaped holes 96 for capturing the fastener posts 28b by engaging the circumferential slots 88. When the slides 92 are pushed up, the lower, larger portion of the key hole 96 allows the panel 86 to be firmly placed against the frame 14 in a horizontal motion. Pushing down the slides 92 by use of the tabs 94 moves the narrower portion of the keyhole 96 down to engage the circumferential slots 88 of the fastener posts 28b. With the slides 92 in the lower position, the slides 92 are captured by the circumferential slots 88 in the fastener posts 28b and the panel 86 is fixed in position.

The lower, larger portion of the slider keyhole 96 has an edge 100 that is slightly displaced so that it will not engage the post circumferential slots 88 and interfere with easy removal of the panel 86.

In FIG. 1, the security panel 86 is shown on the outside of the assembled unit 10, where it may be mounted on the outside fastener posts 28a. When used in that way, its main function is to secure the pet door against the entry of pets or animals. The security panel 86 can be easily removed by someone outside a building, in that case. To secure the pet door against human intruders, the security panel 86 may be mounted on the inside of the assembled unit, mounted on the inside fastener posts 28b. There, it may not be removed by someone from outside the door or wall, and provides the desired security.

Figure 9:
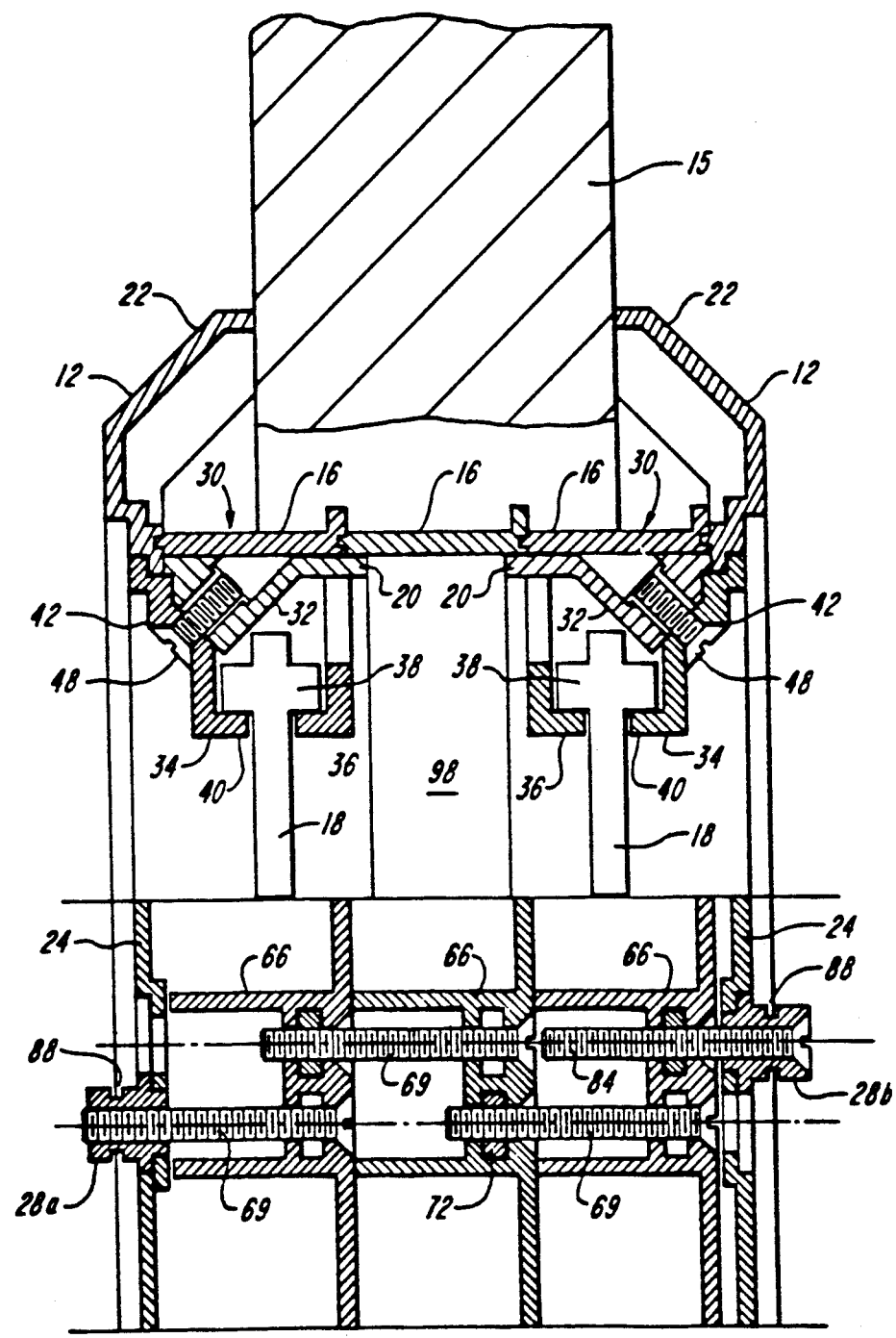
FIG. 9 is a cross-sectional view of the frame in an assembly that provides two flaps.

FIG. 9 shows an embodiment of the invention in which both exterior frames are flap-bearing frames 12. The view is similar to that of FIG. 3, and similar pieces have the same reference numerals as in FIG. 3. The assembly shown in FIG. 9 shows three spacers 16, two flap-bearing frames 12, and two flaps 18. The two flaps 18 provide an insulating air space 98 between them, and are therefore extremely useful for buildings where extreme weather conditions may prevail.

What is claimed is:

1. A pet access door unit for insertion into a hole cut in a door or wall, comprising:

two exterior frame elements each completely defining an opening, for mounting at an edge of said hole, on opposite sides of said hole, at least one of said exterior frame elements including attachment means for attaching a pet access door, at least one spacer frame completely defining an opening, for insertion in said hole between said exterior frames, said spacer frame being in telescoping arrangement with at least one of said exterior frame elements, and means for fastening said exterior frame elements to said spacer frame.

2. The unit of claim 1 wherein said spacer frame has fastener brackets for fasteners extending horizontally to fasten said exterior frame elements and said spacer frame into a unit.

3. The unit of claim 1 wherein more than one of said spacer frames are arranged to be in abutting relationship to each other.

4. The unit of claim 3 wherein opposing vertical surfaces of said spacer frames have nestable tongue and groove surfaces.

5. The unit of claim 1 wherein each of both exterior frame elements has attachment means for attaching a pet access door to said frame element.

6. A pet access door unit for insertion into a hole cut in a door or wall, comprising:

an exterior frame defining an opening, for mounting at an edge of said hole, a plurality of posts extending horizontally from said exterior frame, a security panel sized to close said opening, at least one slider, slidably mounted in said security panel, with means for engaging said posts to secure said security panel to said frame.

7. A pet access door unit for insertion into a hole in a door or wall, comprising:

an exterior frame defining an opening, for mounting at an edge of said hole, a plurality of posts extending horizontally from said exterior frame, a security panel sized to close said opening, at least one slider, slidably mounted in said security panel, with means for engaging said posts wherein said posts bear annular grooves and said slider defines keyhole-shaped holes with lower wider and upper narrower portions, the portion of the slider with the narrower portion of the hole being engageable with said post grooves, whereby said security panel may be moved to said frame in a horizontal motion for securing to said frame.

8. The unit of claim 7 wherein the portion of the slider adjacent the lower edge of the wider portion of the keyhole-shaped hole has an edge portion displaced to not engage said post groove.

9. A pet access door unit for insertion into a hole cut in a door or wall, comprising an exterior frame defining a pet passage opening, for mounting at an edge of said hole, a pet access door, a pet access door securing bar for capturing an upper portion of said pet access door between said bar and said frame, and at least one fastener for fastening said bar to said frame wherein said exterior frame defines a first lip portion, said bar defines a second lip portion, and said pet access door has an upper portion including projecting portions captured by said first and second lip portions when said bar is fastened to said frame.

* * * * *